United States Patent
Chen et al.

(10) Patent No.: US 9,532,093 B2
(45) Date of Patent: Dec. 27, 2016

(54) INITIATING A UNICAST STREAM BASED ON A TRIGGERING EVENT ASSOCIATED WITH A NODE RECEIVING A MULTICAST STREAM

(75) Inventors: Jeff Chen, Jamesville, NY (US); Leo Cloutier, Falls Church, VA (US)

(73) Assignee: Bright House Networks, LLC, East Syracuse, NY (US)

(\*) Notice: Subject to any disclaimer, the term of this patent is extended or adjusted under 35 U.S.C. 154(b) by 707 days.

(21) Appl. No.: 13/471,527

(22) Filed: May 15, 2012

(65) Prior Publication Data
US 2013/0308635 A1 Nov. 21, 2013

(51) Int. Cl.
| H04B 7/00 | (2006.01) |
| H04N 21/2662 | (2011.01) |
| H04N 21/6408 | (2011.01) |
| H04N 21/6587 | (2011.01) |

(52) U.S. Cl.
CPC ...... *H04N 21/2662* (2013.01); *H04N 21/6408* (2013.01); *H04N 21/6587* (2013.01)

(58) Field of Classification Search
CPC ............ H04L 67/2819; H04L 67/2823; H04L 67/2828; H04L 67/303; H04L 67/306
USPC ................. 370/310, 328, 389, 390
See application file for complete search history.

(56) References Cited

U.S. PATENT DOCUMENTS

| 7,168,086 | B1 * | 1/2007 | Carpenter et al. ............... 725/98 |
| 7,472,197 | B2 * | 12/2008 | Li et al. ......................... 709/231 |
| 7,593,326 | B2 * | 9/2009 | Collet et al. ................... 370/229 |
| 7,760,740 | B2 * | 7/2010 | Broberg ....................... 370/395.5 |
| 7,916,755 | B2 * | 3/2011 | Hasek et al. ................... 370/486 |
| 8,024,762 | B2 * | 9/2011 | Britt ................................. 725/92 |
| 8,204,055 | B2 * | 6/2012 | Bichot et al. .................. 370/390 |
| 8,312,494 | B2 * | 11/2012 | Collet et al. .................... 725/97 |
| 8,452,885 | B2 * | 5/2013 | Sherer et al. ................... 709/231 |
| 2009/0083811 | A1 * | 3/2009 | Dolce et al. ...................... 725/93 |
| 2009/0165044 | A1 * | 6/2009 | Collet et al. .................... 725/38 |
| 2009/0293090 | A1 * | 11/2009 | Quigley et al. ................. 725/62 |
| 2011/0083153 | A1 * | 4/2011 | Cedervall et al. .............. 725/88 |
| 2011/0119703 | A1 * | 5/2011 | Schlack et al. ................. 725/34 |
| 2012/0155358 | A1 * | 6/2012 | Hao et al. ...................... 370/312 |

\* cited by examiner

*Primary Examiner* — Dmitry H Levitan
(74) *Attorney, Agent, or Firm* — Withrow + Terranova, PLLC

(57) ABSTRACT

Mechanisms for initiating a unicast video stream in response to a triggering event from a client node receiving a multicast video stream are disclosed. A distribution node communicatively coupled to a plurality of client nodes multicasts a first video stream of a program encoded in a first format to the plurality of client nodes. The distribution node detects a triggering event associated with a first client node of the plurality of client nodes that is receiving the first video stream. In response to the triggering event, a second video stream of the program encoded in a second format is unicasted.

3 Claims, 6 Drawing Sheets

INITIATING A UNICAST STREAM BASED ON A TRIGGERING EVENT ASSOCIATED WITH A NODE RECEIVING A MULTICAST STREAM

FIELD OF THE DISCLOSURE

The present disclosure relates generally to distribution of content over a network, and in particular to initiating a unicast stream based on a triggering event associated with a node receiving a multicast stream.

BACKGROUND

Multicasting enables a content distributor to distribute a single copy of media content, such as a movie, to multiple client nodes concurrently. Multicasting therefore consumes less bandwidth of the network than would be required to separately unicast the content to each client node over the network. To further reduce the bandwidth required to distribute video media content, the content is frequently compressed, or encoded, prior to distribution over the network and is then uncompressed, or decoded, at the client node prior to presentation of the video content on a display.

There are certain events associated with a client node that is receiving a multicast video stream of a program that cause a distributor of the multicast video stream to begin unicasting a video stream of the program. In such situations, it may be possible to unicast the program using a different compression format than that used by the multicast video stream of the program, and thereby gain advantages associated with the use of the different compression format for the unicast stream.

SUMMARY

The present disclosure relates to mechanisms for unicasting a video stream of a program after detecting a triggering event associated with a client node that is receiving a multicast video stream of the program. In one embodiment, a distribution node multicasts a first video stream of a program encoded in a first format to a plurality of client nodes. A triggering event associated with a first client node of the plurality of client nodes is detected. In response to the triggering event, a second video stream of the program encoded in a second format is unicasted.

In one embodiment, the distribution node unicasts the second video stream to the first client node in the second format while concurrently multicasting the first video stream. The second format differs from the first format, and may comprise a different compression scheme than the compression scheme of the first format. In one embodiment, the first format comprises an MPEG-2 compression scheme, and the second format comprises an MPEG-4 compression scheme. In another embodiment, the second format may comprise the same compression scheme as the first format, but differ from the first format based on one or more other compression criteria used to encode the first and second video streams.

In one embodiment, the distribution node unicasts the second video stream from a second content offset that is different from a first content offset from which the distribution node is concurrently multicasting the first video stream. For example, the second content offset may be at an earlier point in time of the program than the first content offset.

In one embodiment, a digital video recorder (DVR) video stream of the program encoded in the second format is provided to a network DVR associated with the first client node while the first video stream of the program encoded in the first format is concurrently multicasted to the plurality of client nodes. Upon detecting the triggering event, the second video stream of the program encoded in the second format is provided by the network DVR to the first client node.

In one embodiment, the triggering event comprises a trick play event, such as a rewind event, a start over event, a pause event, or a forward event.

The distribution node may determine whether the first client node is capable of decoding content encoded in the second format prior to unicasting the second stream to the first client node. In one embodiment, the distribution node may access capabilities data that is stored remotely from the first client node and that identifies capabilities of the first client node, and based on the capabilities data, the distribution node may determine that the second client node is capable of decoding content encoded in the second format. In another embodiment, the distribution node may request from the first client node capabilities data that identifies capabilities of the first client node. The distribution node receives the requested capabilities data, and based on the capabilities data determines that the second client node is capable of decoding content encoded in the second format.

In another embodiment, the triggering event comprises a device transition request generated by the first client node. The device transition request identifies a second client node, and the second video stream encoded in the second format is unicasted to the second client node.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
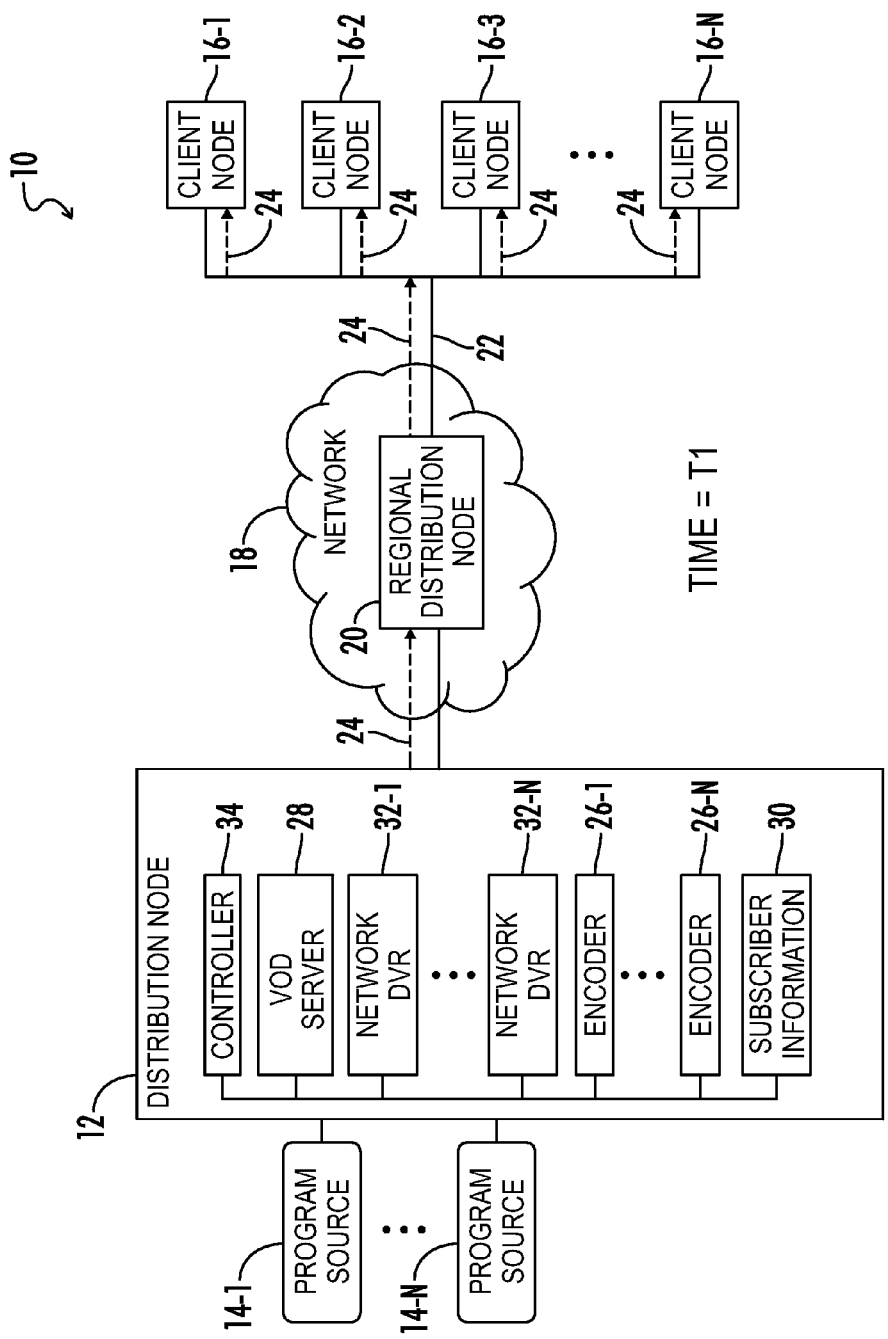
FIGS. 1A and 1B are block diagrams of an exemplary system in which embodiments of the present disclosure may be practiced.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Multicasting enables a distribution node to distribute a single copy of a program to multiple client nodes concurrently. As used herein, "program" refers to a movie, a television program, or a recorded event of any nature that comprises video. Multicasting consumes less bandwidth of the network than would be required to separately unicast the program to each client node over the network. To further reduce the bandwidth required to distribute a program, the program is frequently compressed, or encoded, prior to distribution over the network and is then uncompressed, or decoded, at the client node prior to presentation of the program on a display.

Compression of digital information is the subject of substantial research and development, and new compression schemes are continually being developed. As used herein, "compression scheme" or "scheme" refers to particular compression mechanisms, or specifications, such as MPEG-2 Part 2, MPEG-4 Part 2, H.264 (MPEG-4 Part 10), Theora, Dirac, RealVideo RV40, VP8, or the like. "Compression format" or "format" refers to a program, or a copy of a program, that has been encoded based on one or more particular compression criteria. The criteria may include the particular compression scheme, the bit rate, the frame rate, the frame size, or any other parameters that are used to generate the encoded copy. Two copies of the same program that have been encoded using different compression criteria will be referred to as having different formats, or compression formats. For example, two copies of a program may be generated using the same compression scheme, i.e., MPEG-2 Part 2, but different bit rates, in which event the formats of the two copies would be referred to herein as being different formats.

Newer compression schemes typically offer higher compression ratios with the same or better picture quality compared to older compression schemes, and thus use less network bandwidth to stream a program without any reduction in picture quality. This is generally highly desirable, and particularly so where network bandwidth is finite and customer expectations are high, such as those faced by multiple system operators (MSOs) and other video content service providers.

As newer compression schemes are implemented in new products, older products may not be able to take advantage of such newer compression schemes. In other words, an older product may not be able to uncompress, or decode, programs that have been compressed, or encoded, using a compression scheme that was developed after the manufacture of the older product. However, since prior to the development of the new compression scheme existing programs were necessarily encoded with an older compression scheme, the new products are typically "backward" compatible such that they can decode programs that have been encoded in accordance with older compression schemes.

A distributor of video content may determine, or otherwise know, that some potential recipient client nodes of a multicast video stream are only capable of decoding a program that has been encoded using an older compression scheme, or using a particular format, while other potential client nodes could decode a multicast video stream that has been encoded using a newer compression algorithm, or a different format. In this situation, in order to multicast a video stream to all of the client nodes, the distributor multicasts a video stream that is encoded using a compression format that each client node can decode, even though this frequently means selecting a format that is not ideal for at least some of the client nodes.

There are certain events associated with a client node that receives a multicast video stream of a program that cause a distributor of the multicast video stream to begin unicasting a video stream of the program. For example, many MSOs today offer a "start over" feature that permits a client node, such as a set-top box (STB), to request that a program that is in progress be started from the beginning for the particular STB. This results in the distribution node initiating a unicast stream of the program to the STB. If the STB is capable of decoding a format that is different from that used in the multicast stream of the program, it may be preferable for the distribution node to unicast the program in the different format.

Figure 1B:
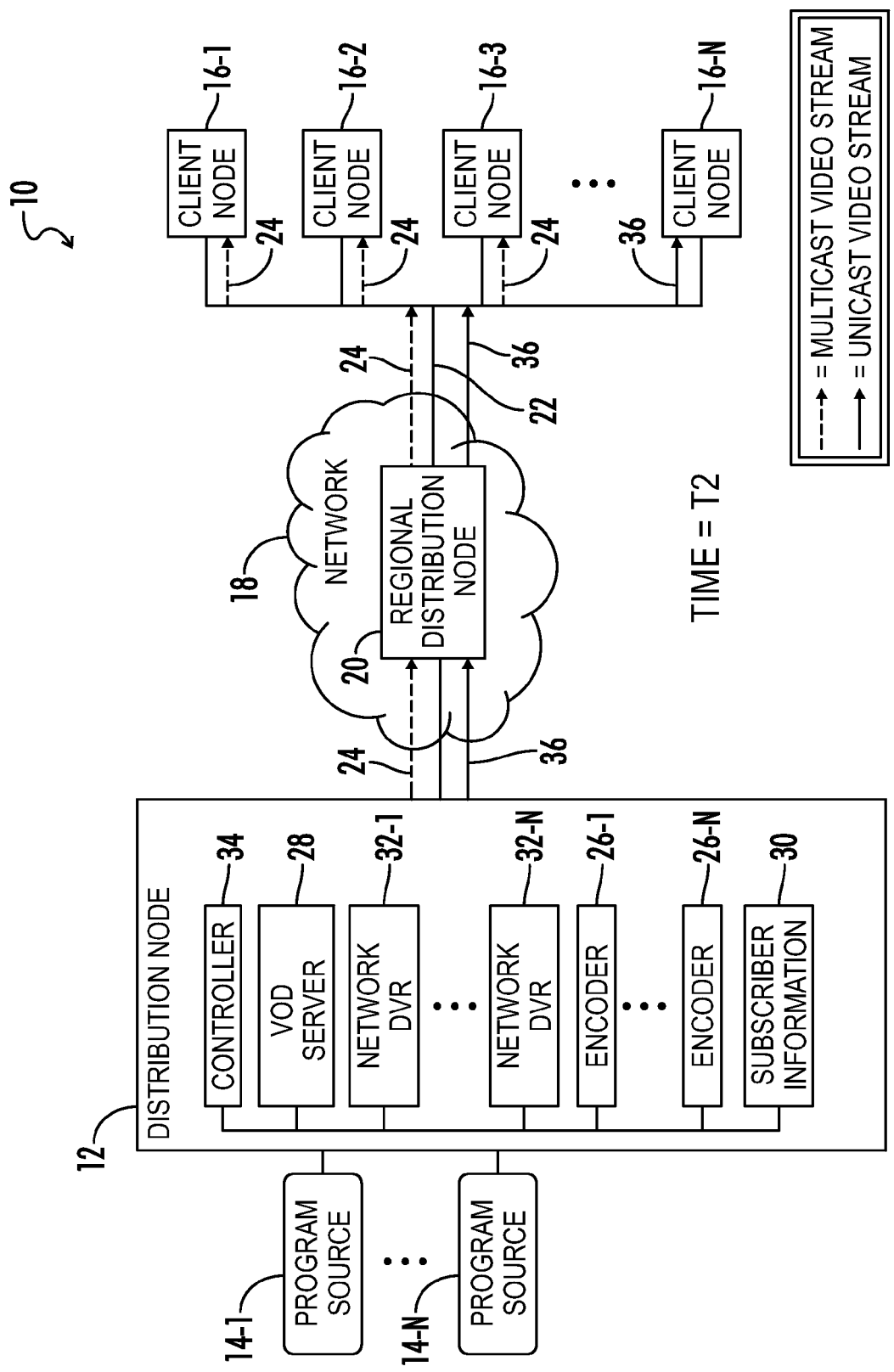

FIGS. 1A and 1B are block diagrams of an exemplary system 10 at times T1 and T2, respectively, in which embodiments of the present disclosure may be practiced. For purposes of illustration, embodiments will be disclosed herein in the context of a cable service provider, but it will be apparent to those skilled in the art upon reading the present disclosure that the principles are applicable to other video content service providers, such as satellite service providers, Internet service providers, and the like. Referring first to FIG. 1A, a distribution node 12 typically receives programs from a number of program sources 14-1-14-N (generally, program sources 14). For example, the program source 14-1 may comprise a satellite feed from broadcast television providers, and the program source 14-N may comprise a video-on-demand (VOD) source of programs. Each program may be encoded in one or more different formats. Thus, there may be multiple copies of the same program, each copy of which is encoded in a different format. The encoded copies may be received from the program sources 14, or may be generated by the distribution node 12, or another network node, upon receipt from the program sources 14. As discussed in greater detail herein, the distribution node 12 may comprise one or more communicatively coupled computing devices and/or components that implement the functionality described herein.

The distribution node 12 is communicatively coupled to a plurality of client nodes 16-1-16-N (generally, client nodes 16) via a network 18. In the context of a cable service provider, the client nodes 16 may comprise, for example, STBs; computers; mobile computing devices, such as tablet computers or smartphones; or other media stations capable of receiving programs from the distribution node 12 and otherwise communicating with the distribution node 12. The network 18 may comprise one or more public networks, proprietary networks, or any combination thereof which implement a communication path between the distribution node 12 and the client nodes 16. In the context of a cable service provider, the network 18 typically includes a plurality of regional distribution nodes 20 (only one shown), each of which provides certain services to a group of client nodes 16 via a communication link 22. The communication link 22 may comprise any suitable communication medium, such as a coaxial feeder or the like.

In one embodiment, the system 10 may comprise a switched digital video (SDV) network in which bandwidth is allocated on the network 18 for a program upon request from one of the client nodes 16. The request may be for a particular program, or for a particular channel on which a program is, or will be, delivered. Thus, if no client node 16 is currently requesting channel 5, then the regional distribution node 20 does not allocate bandwidth on the communication link 22 for programs being shown on channel 5.

In certain situations, the distribution node 12 multicasts a video stream of a program over the network 18 to one or more client nodes 16. Multicasting is a mechanism where the distribution node 12 sends a single video stream of a program in such a manner that multiple client nodes 16 may receive the video stream. In one embodiment, multicasting is accomplished by addressing the video stream to a particular multicast address that is known to the client nodes 16, and to which they may "tune" to receive the video stream. A video stream that is multicasted may be referred to herein as a "multicast video stream." Unicasting is a mechanism where the distribution node 12 sends a single video stream of a program to a particular client node 16. Unicasting is typically accomplished by addressing the video stream to the address of the particular client node 16. A video stream that is unicasted may be referred to herein as a "unicast video stream."

If several client nodes 16 request the same program, multicasting a single video stream of the requested program to the multiple client nodes 16 is preferable to unicasting multiple video streams of the requested program because less bandwidth of the network 18 is utilized to multicast a single video stream than would be required to unicast multiple video streams. There are a variety of situations in which multicasting may be utilized. For example, the distribution node 12 may multicast regular real-time network programming so that only a single copy of the programs of each channel are distributed over the network 18. The use of multicast for distributing content is often appropriate for programming that is played on a pre-defined schedule such as with broadcast video channels, Pay Per View events or live programming.

Programs, whether multicasted or unicasted, are typically compressed prior to distribution over the network 18. In particular, programs are encoded into a particular format based on one or more compression criteria. The compression criteria can include, for example, a particular compression scheme, such as MPEG-2 Part 2, MPEG-4 Part 2, H.264 (MPEG-4 Part 10), Theora, Dirac, RealVideo RV40, VP8, or the like. Other compression criteria can include, for example, a particular bit rate or frame rate, or any other parameters that may be used by an encoder to generate an encoded copy of a program in a particular compression format. The programs may be compressed in advance of being distributed over the network 18, or may be compressed "on the fly" while the programs are being distributed over the network 18. A compressed program is streamed over the network 18 in a data stream referred to herein as a "video stream." The video stream comprises the digital data that represents the program, and is in a particular format based on the compression criteria used to generate the compressed program. Copies of the same program that are compressed using identical criteria are in the same format, and copies of the same program that are compressed using different criteria are in different formats.

The distribution node 12 may include one or more encoders 26-1-26-N (generally, encoders 26) that are used to encode, or compress, the programs received from the program sources 14 into video streams having particular formats based on the compression criteria used by the encoders 26. The distribution node 12 may also include a VOD server 28 which provides a VOD service to the client nodes 16. The distribution node 12 may store subscriber information 30 that includes information about users of, or subscribers to, the services provided by the system 10, including capabilities data that identifies capabilities of each individual client node 16. The distribution node 12 may also include one or more network digital video recorders (DVRs) 32-1-32-N (generally, network DVRs 32), each of which stores programs that a user designates for recording, as well as any current program currently being received by a corresponding client node 16. A controller 34 may provide overall control and coordination between the various elements of the distribution node 12.

As a client node 16 receives a video stream distributed by the distribution node 12, the client node 16 decodes the video stream and presents it on a display to a user. The client nodes 16 may differ from one another, and thus some client nodes 16 may be able to decode video streams encoded in a first format, but not video streams encoded in a different second format. One common situation is where some of the client nodes 16 are newer than others of the client nodes 16, and the newer client nodes 16 contain a decoder that decodes video streams encoded in accordance with a compression scheme that was not in existence at the time the older client nodes 16 were manufactured. For example, assume for purposes of illustration that each of the client nodes 16-1-16-3 contains an MPEG-2 Part 2 decoder, and the client node 16-N contains both the MPEG-2 Part 2 decoder and an H.264 (MPEG-4 Part 10) decoder. Thus, the client node 16-N can decode video streams encoded in accordance with either the MPEG-2 Part 2 compression scheme or the H.264 compression scheme, while the client nodes 16-1-16-3 can only decode a video stream encoded in accordance with the MPEG-2 Part 2 compression scheme. The use herein of ordinals in conjunction with an element is solely for distinguishing what might otherwise be similar or identical labels, such as "first format" and "second format," and does not imply a priority, an importance, or anything else, unless otherwise stated herein.

Assume that the distribution node begins to multicast a video stream of a program to each of the client nodes 16. Newer compression schemes frequently offer higher compression ratios with little or no reduction in video quality, and thus a video stream encoded in accordance with a newer compression scheme will frequently utilize less bandwidth but provide the same or better video quality than a video stream encoded in accordance with an older compression scheme. Unfortunately, when multicasting is utilized, the multicast video stream must be encoded in a format that is decodable by all recipient client nodes 16. Thus, even though the client node 16-N can decode a video stream encoded in accordance with the H.264 compression scheme, which may offer a higher compression ratio and better picture quality than that offered by a video stream encoded in accordance with the MPEG-2 Part 2 compression scheme, the distribution node 12 multicasts a first video stream 24 encoded in accordance with an MPEG-2 Part 2 compression scheme so that each client node 16 can decode the video stream.

Figure 2:
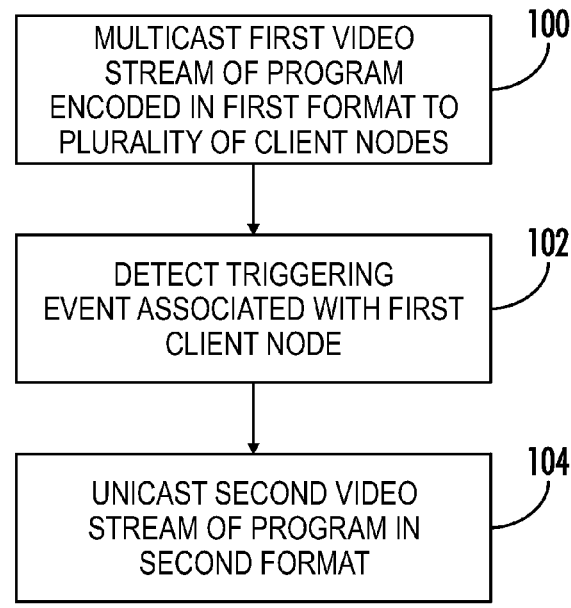
FIG. 2 is a flowchart illustrating an exemplary process for initiating a unicast video stream based on a triggering event associated with a client node according to one embodiment.

In one embodiment, the distribution node 12 detects a triggering event associated with a client node 16 that is receiving the multicast of the first video stream 24. The triggering event may cause a second video stream of the same program to be unicasted. FIG. 2 is a flowchart illustrating an exemplary process for initiating a unicast video stream based on a triggering event associated with a client node 16 according to one embodiment. FIG. 2 will be discussed in conjunction with FIGS. 1A and 1B.

Referring first to FIGS. 2 and 1A, initially, at time T1, the distribution node 12 multicasts the first video stream 24 of the program encoded in a first format to the client nodes 16 (FIG. 2, block 100). The distribution node 12 detects a triggering event associated with a first client node 16, such as the client node 16-N, that is receiving the first video stream 24 (FIG. 2, block 102). Referring now to FIGS. 2 and 1B, in response to the triggering event, at time T2, the distribution node 12 unicasts a second video stream 36 of the program encoded in a second format to the client node 16-N (FIG. 2, block 104).

A triggering event may comprise any of a number of different events. Some triggering events are caused in response to a user's interaction with the client node 16-N. In particular, the user may request a trick play feature which results in the generation of a corresponding trick play event by the client node 16-N. For example, the user may request a rewind feature that indicates a desire to rewind the program from a current content offset of the program to a previous content offset of the program. In response, the client node 16-N transmits or otherwise communicates a rewind event to the distribution node 12. Other trick play features include a start over feature, a pause feature, a restart feature, and a forward feature. The start over feature is a feature wherein, upon request, the distribution node 12 will begin streaming a video stream of a program that is currently being received by the client node 16-N from the start of the program. The pause feature is a feature wherein, upon request, the distribution node 12 pauses streaming of a video stream of a program for a predetermined period of time, or until such time as the client node 16-N communicates a restart event to the distribution node 12. The forward feature is a feature wherein, upon request, the distribution node 12 will begin advancing relatively rapidly through the content offsets of the program that is currently being received by the client node 16-N. Initiation of any of such trick play features causes the client node 16-N to generate and communicate to the distribution node 12 a corresponding trick play event, such as a start over event, a pause event, or a forward event, respectively.

Because the triggering event requires that the program be provided to the client node 16-N at a content offset that is different from the current content offset of the first video stream 24, the distribution node 12 unicasts the second video stream 36 to the client node 16-N while concurrently multicasting the first video stream 24 to the client nodes 16-1-16-3. Because the second client node 16-N is capable of decoding a video stream encoded using the H.264 compression scheme, the distribution node 12 unicasts the second video stream 36 in a format that is different from the format of the first video stream 24. Specifically, the second video stream 36 is encoded using the H.264 compression scheme, while, as discussed above, the first video stream 24 was encoded using the MPEG-2 Part 2 compression scheme. Because the H.264 compression scheme may require less bandwidth with no reduction in video quality, the second video stream 36 utilizes less bandwidth than would be required if the distribution node 12 simply unicasted the second video stream 36 in the first format.

In one embodiment, prior to unicasting the second video stream 36 to the client node 16-N, the distribution node 12 may first determine that the client node 16-N is capable of decoding content encoded in the second format. In the example above, this may involve determining that the client node 16-N is capable of decoding a video stream encoded using a H.264 compression scheme. In one embodiment, capabilities data that identifies capabilities of the client node 16-N (and the other client nodes 16) may be maintained in the subscriber information 30. The distribution node 12 accesses the capabilities data, and based on the capabilities data, determines that the client node 16-N is capable of decoding content in the second format. In another embodiment, the distribution node 12 may request capabilities data from the client node 16-N. The distribution node 12 receives the requested capabilities data, and based on the capabilities data, determines that the client node 16-N is capable of decoding content in the second format.

Figure 3:
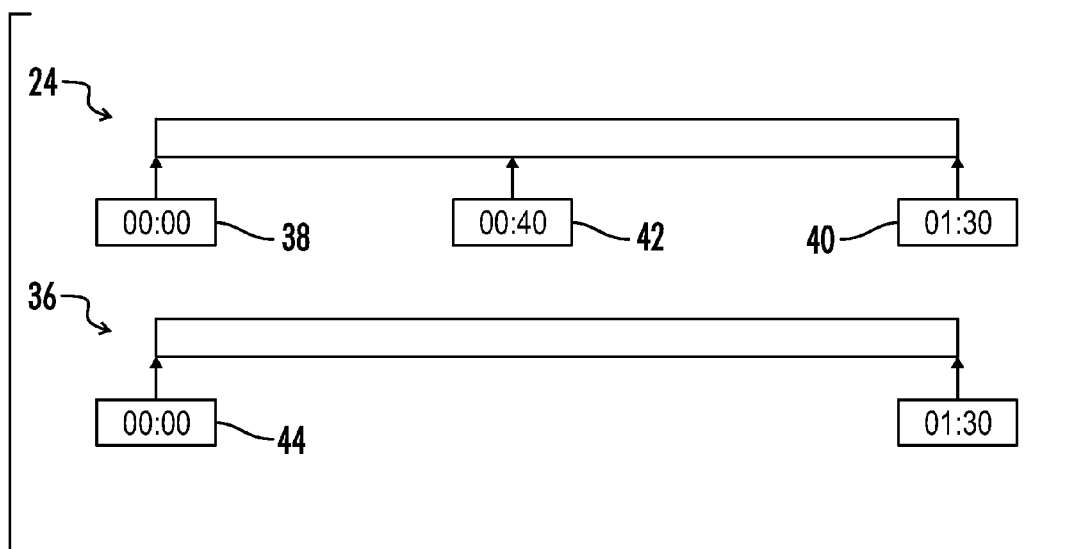
FIG. 3 is a block diagram illustrating different content offsets of two video streams of the same program.

FIG. 3 is a block diagram illustrating different content offsets of two video streams of the same program. The first video stream 24 may be initially multicasted starting at a content offset 38 that is at the beginning of the program. Content offset 40 of the program is at the end of the program. Assume that at the point in time that the distribution node 12 detects the triggering event associated with the client node 16-N, the distribution node 12 is multicasting the first video stream 24 at a content offset 42 (40 minutes after the beginning of the program). Assume further that the triggering event is a start over event. Accordingly, the distribution node 12 initiates the second video stream 36 at a content offset 44 (the beginning of the program) while continuing the multicast of the first video stream 24 from the content offset 42. Thus, the current content offset of the first video stream 24 may be different from the current content offset of the second video stream 36.

Figure 4:
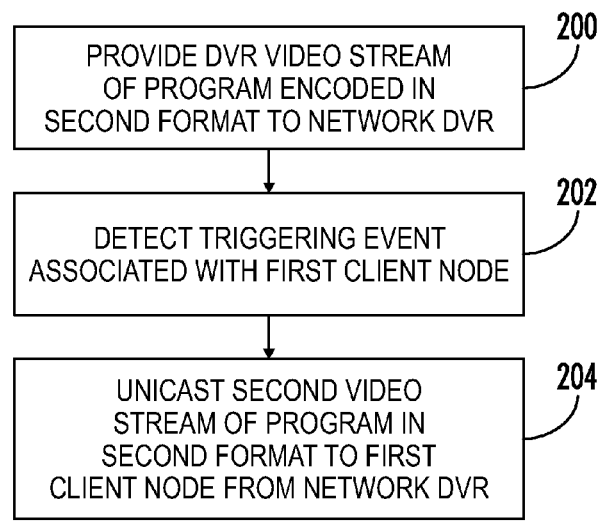
FIG. 4 is a flowchart illustrating an exemplary process for initiating a unicast video stream based on a triggering event associated with a client node according to another embodiment.

FIG. 4 is a flowchart illustrating an exemplary process for initiating a unicast video stream based on a triggering event associated with a client node 16 according to another embodiment. FIG. 4 will be discussed in conjunction with FIGS. 1A and 1B. In this embodiment, assume that the user of the client node 16-N subscribes to a network DVR service. Assume further that the network DVR 32-N is associated with the client node 16-N, and thus, as the first video stream 24 is multicasted to the client node 16-N at time T1, as illustrated in FIG. 1A, the distribution node 12 also provides a DVR video stream of the program to the network DVR 32-N. In one embodiment, the distribution node 12 determines that the client node 16-N is capable of decoding content encoded in the second format, and thus while multicasting the first video stream 24 of the program encoded in the first format, concurrently provides the DVR video stream of the program encoded in the second format to the network DVR 32-N (FIG. 4, block 200).

Assume that the user of the client node 16-N initiates the rewind feature, causing the client node 16-N to generate and send a triggering event (i.e., a rewind event) to the distribution node 12. The distribution node 12 detects the triggering event (FIG. 4, block 202). The distribution node 12 then causes the second video stream 36 of the program encoded in the second format to be unicasted to the client node 16-N from the network DVR 32-N (FIG. 4, block 204).

Figure 5:
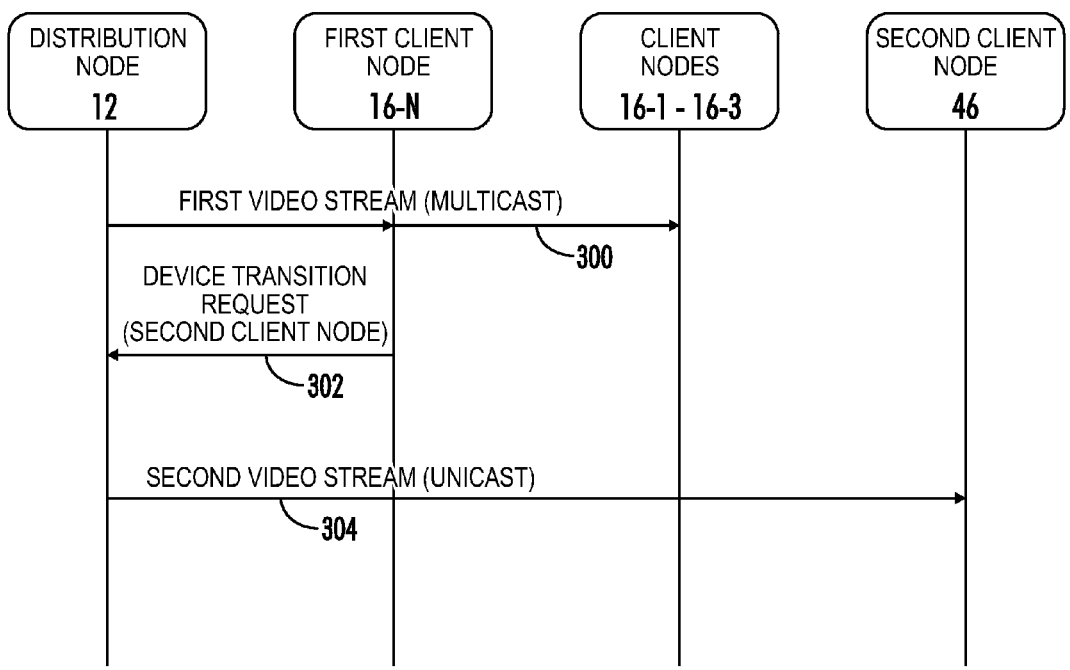
FIG. 5 is a message flow diagram illustrating an exemplary process for initiating a unicast video stream based on a triggering event associated with a client node according to yet another embodiment.

FIG. 5 is a message flow diagram illustrating an exemplary process for initiating a unicast video stream based on a triggering event associated with a client node 16 according to yet another embodiment. In this embodiment, the distribution node 12 multicasts the first video stream 24 to the client nodes 16-1-16-N, as discussed previously (FIG. 5, step 300). In this embodiment, however, the triggering event comprises a device transition request that identifies a second client node 46 to which the program should be transitioned (FIG. 5, step 302). For example, the second client node 46 may comprise a computing tablet, a cellular phone, another STB, or any other processing device capable of receiving a video stream. The distribution node 12 then unicasts a second video stream 36 of the program encoded in a second format to the second client node 46 (FIG. 5, step 304).

In one embodiment, the distribution node 12 may access capabilities data identifying capabilities of the second client node 46 to determine the second format. For example, assume that the second client node 46 comprises a cellular telephone with a low-resolution display. The distribution node 12 may therefore select a format that comprises a lower bit rate than the format of the first video stream 24. It will be apparent that in a situation where the second client node 46 is communicatively coupled to the distribution node 12 via a different communication link than the communication link coupling the first client node 16-N to the distribution node 12, other networks may be used to unicast the second video stream to the second client node 46. For example, where the second client node 46 comprises a smartphone, the distribution node 12 may provide the second video stream at least in part via a 3G telecommunications network that provides data service to the second client node 46.

Figure 6:
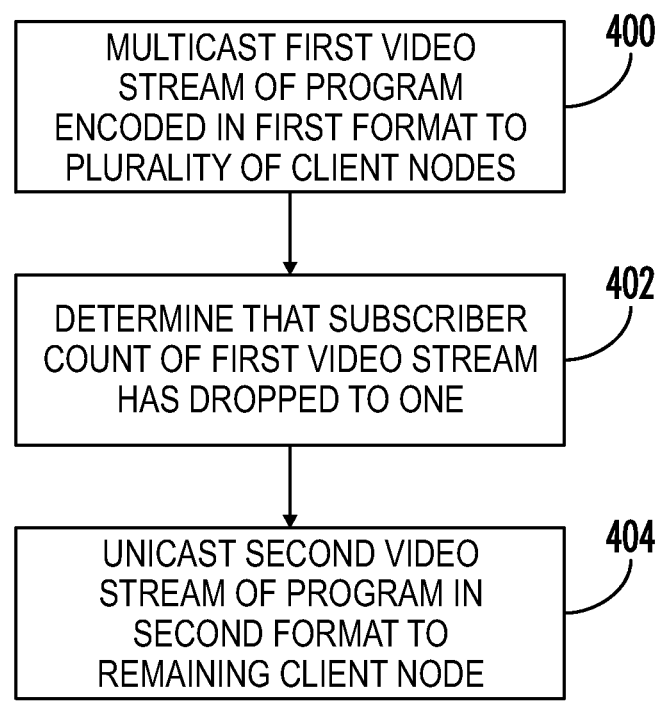
FIG. 6 is a flowchart illustrating an exemplary process for initiating a unicast video stream based on a triggering event associated with a client node according to still another embodiment.

FIG. 6 is a flowchart illustrating an exemplary process for initiating a unicast video stream based on a triggering event associated with a client node 16 according to another embodiment. FIG. 6 will be discussed in conjunction with FIGS. 1A and 1B. In this embodiment, the distribution node 12 multicasts the first video stream 24 to the client nodes 16-1-16-N as discussed previously (FIG. 6, block 400). Assume, over time, that each of the client nodes 16-1-16-3 tunes to another program, and thus drops the first video stream 24. As each of the client nodes 16-1-16-3 tunes to another program, the distribution node 12 keeps track of the number of client nodes 16 that are subscribed to, or receive, the first video stream 24. For example, the distribution node 12 may maintain a subscriber count that indicates the number of client nodes 16 that are currently receiving the first video stream 24. As a client node 16 begins to receive the first video stream 24, the distribution node 12 increments the subscriber count, and as a client node 16 drops the first video stream 24, the distribution node 12 decrements the subscriber count. After each of the client nodes 16-1-16-3 has dropped the first video stream 24, the distribution node 12 determines that the subscriber count of the first video stream is one (FIG. 6, block 402). The distribution node 12 detects the dropping of the subscriber count to one as a triggering event. The distribution node 12 then ceases multicasting the first video stream 24 of the program encoded in the first format, and initiates unicasting of the second video stream 36 of the program encoded in the second format to the remaining client node 16-N (FIG. 6, block 404). In this embodiment, the distribution node 12 unicasts the second video stream 36 from the same content offset at which the first video stream 24 was terminated so that the transition from the first video stream 24 to the second video stream 36 is transparent to the user of the client node 16-N.

Figure 7:
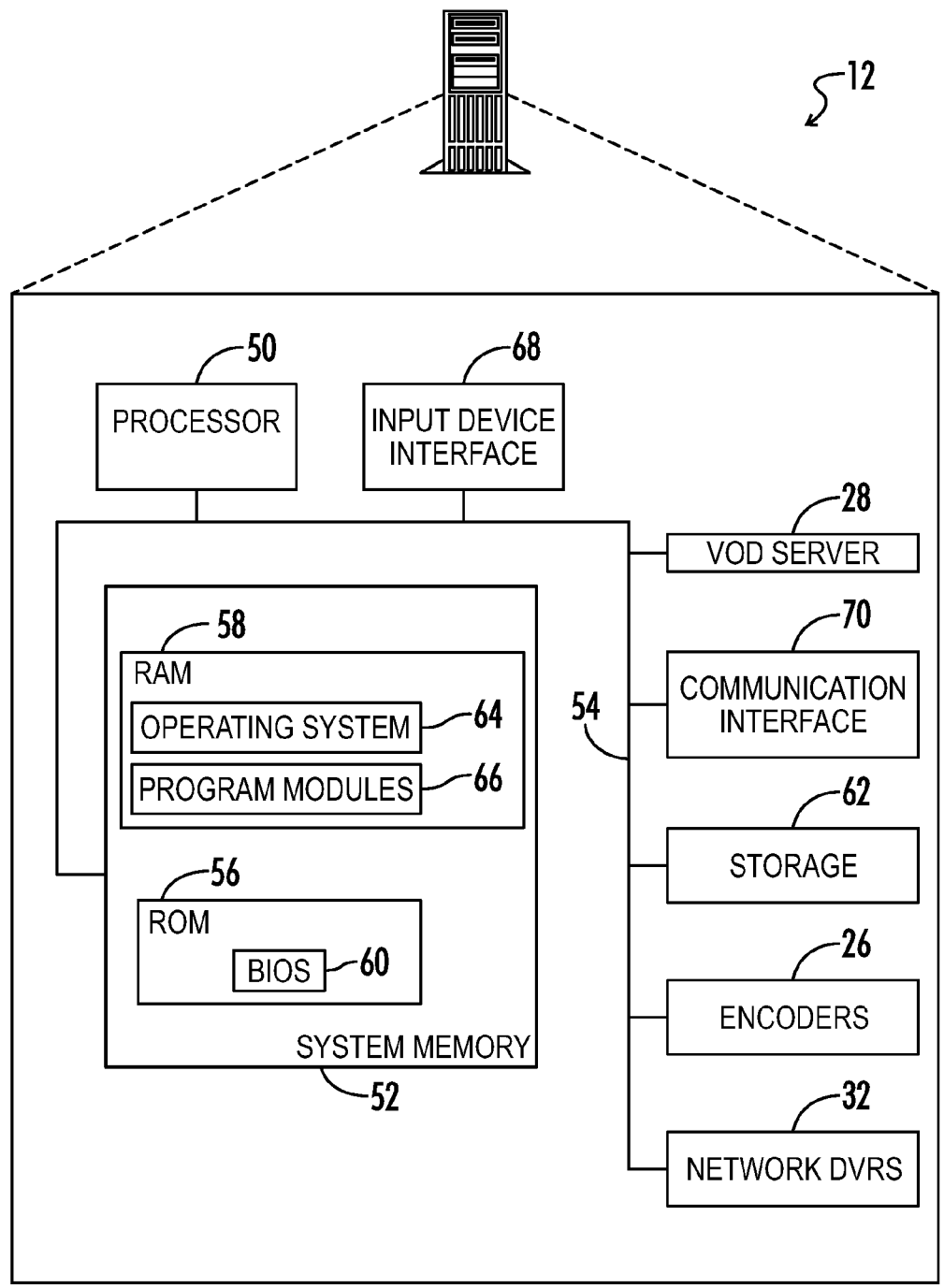
FIG. 7 illustrates an exemplary distribution node according to one embodiment.

FIG. 7 illustrates an exemplary distribution node 12 according to one embodiment. The distribution node 12 may comprise a number of components, or modules, which are packaged in one or more pieces of equipment communicatively coupled together, or may comprise a single piece of equipment. FIG. 7 illustrates one exemplary embodiment where the various components and modules are housed in a single frame, but the embodiments herein are not limited to any particular configuration of the distribution node 12. In one embodiment, the distribution node 12 comprises a processor 50 that is coupled to a system memory 52 via a system bus 54. The system bus 54 provides an interface for system components including, but not limited to, the system memory 52 and the processor 50. The processor 50 can be any of various commercially available or proprietary processors. Dual microprocessors and other multi-processor architectures may also be employed as the processor 50.

The system bus 54 may be any of several types of bus structures that may further interconnect to a memory bus (with or without a memory controller), a peripheral bus, and/or a local bus using any of a variety of commercially available bus architectures. The system memory 52 may include non-volatile memory 56 (e.g., read only memory (ROM), erasable programmable read only memory (EPROM), electrically erasable programmable read only memory (EEPROM), etc.) and/or volatile memory 58 (e.g., random access memory (RAM)). A basic input/output system (BIOS) 60 may be stored in the non-volatile memory 56, and can include the basic routines that help to transfer information between elements within the distribution node 12. The volatile memory 58 may also include a high-speed RAM, such as static RAM, for caching data.

The distribution node 12 may further include a storage device 62, which may comprise, for example, an internal hard disk drive (HDD) (e.g., enhanced integrated drive electronics (EIDE) or serial advanced technology attachment (SATA)) for storage, flash memory, or the like. The storage device 62 and associated computer-readable and computer-usable media provide non-volatile storage of data, data structures such as the subscriber information 30, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage device 62 and in the volatile memory 58, including an operating system 64 and one or more program modules 66, which may implement the functionality described herein in whole or in part. It is to be appreciated that the embodiments can be implemented with various commercially available operating systems 64 or combinations of operating systems 64.

All or a portion of the embodiments may be implemented as a computer program product, such as a non-transitory computer-usable or computer-readable medium having a computer-readable program code embodied therein. The computer-readable program code can include complex software instructions for implementing the functionality of the embodiments described herein when executed on the processor 50. The processor 50, in conjunction with the program modules 66 in the volatile memory 58, may serve as the controller 34, or as a control system, for the distribution node 12 that is configured to, or adapted to, implement the functionality described herein.

An administrator may be able to enter commands and information into the distribution node 12 through one or more input devices, such as, for example, a touch-sensitive display (not illustrated); a keyboard (not illustrated); or a pointing device, such as a mouse (not illustrated). Other input devices (not illustrated) may include a microphone, an infrared (IR) remote control, a joystick, a game pad, a stylus pen, or the like. These and other input devices are often connected to the processor 50 through an input device interface 68 that is coupled to the system bus 54, but can be connected by other interfaces such as a parallel port, an IEEE 1394 serial port, a game port, a universal serial bus (USB) port, an IR interface, etc.

The distribution node 12 may also include one or more communication interfaces 70 for communicating with, for example, the network 18. The communication interfaces 70 may comprise, for example, wired or wireless network interfaces.

Those skilled in the art will recognize improvements and modifications to the preferred embodiments of the present disclosure. All such improvements and modifications are considered within the scope of the concepts disclosed herein and the claims that follow.

What is claimed is:

1. A distribution node, comprising:
    a communications interface configured to communicate with a network; and
    a controller comprising a processor, the controller coupled to the communications interface and configured to:
        multicast a first video stream of a program encoded in a first format to a plurality of client nodes;
        detect a triggering event associated with a first client node of the plurality of client nodes that is receiving the first video stream, wherein detecting the triggering event associated with the first client node of the plurality of client nodes comprises determining that the first client node is the only client node of the plurality of client nodes that continues to receive the first video stream; and
        in response to the triggering event, unicast a second video stream of the program to the first client node encoded in a second format.

2. The distribution node of claim 1, wherein the first format is based on an MPEG-2 compression scheme criterion and the second format is based on an MPEG-4 compression scheme criterion.

3. The distribution node of claim 1, wherein the controller is further configured to determine that the first client node is capable of decoding content encoded in the second format prior to unicasting the second video stream of the program encoded in the second format.

* * * * *